United States Patent
Hansen et al.

(10) Patent No.: US 7,158,759 B2
(45) Date of Patent: Jan. 2, 2007

(54) DYNAMIC FREQUENCY SELECTION IN A WIRELESS COMMUNICATION NETWORK

(75) Inventors: Christopher J. Hansen, Sunnyvale, CA (US); Joonsuk Kim, Menlo Park, CA (US); Matthew Fischer, Mountain View, CA (US); Rajugopal Gubbi, Saratoga, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 627 days.

(21) Appl. No.: 10/011,004

(22) Filed: Dec. 3, 2001

(65) Prior Publication Data

US 2003/0040319 A1 Feb. 27, 2003

Related U.S. Application Data

(60) Provisional application No. 60/283,848, filed on Apr. 13, 2001.

(51) Int. Cl.
*H04B 17/00* (2006.01)
*H04Q 7/30* (2006.01)
*H04Q 7/32* (2006.01)
*H04Q 7/34* (2006.01)
*H04Q 7/00* (2006.01)

(52) U.S. Cl. .............. 455/67.11; 455/452.2; 455/452.1; 455/67.13; 455/63.3; 455/62; 370/329

(58) Field of Classification Search ...... 455/63.1–63.4, 455/67.11–67.16, 450–459, 464, 522, 575.1; 370/300–395.7
See application file for complete search history.

(56) References Cited

U.S. PATENT DOCUMENTS 5,491,837 A * 2/1996 Haartsen .............. 455/62
6,052,594 A * 4/2000 Chuang et al. .......... 455/450
6,459,901 B1 * 10/2002 Chawla et al. .......... 455/450
6,501,785 B1 * 12/2002 Chang et al. ............ 375/133
6,574,485 B1 * 6/2003 Salonaho et al. ........ 455/522

OTHER PUBLICATIONS

Newton, Harry, Newton's Telecom Dictionary, 2004, 20th, p. 39-40.*

* cited by examiner

*Primary Examiner*—Lester G. Kincaid
*Assistant Examiner*—Matthew C Sams
(74) *Attorney, Agent, or Firm*—Garlick Harrison & Markison; Timothy W. Markison; Bruce E. Stuckman

(57) ABSTRACT

A method and apparatus for dynamic frequency selection in a wireless communication system or network includes processing that begins when an access point determines interference on a wireless channel that is being used by the access point. When the interference exceeds an interference threshold, the access point provides a request packet to affiliated stations being serviced by the access point for channel spectrum information. The processing continues as the affiliated stations generate the channel spectrum information regarding each of the wireless channels in the wireless communication network. The processing proceeds then as the affiliated stations provide the channel spectrum information to the access point via the current wireless channel. The access point interprets the channel spectrum information to determine a desired wireless channel of the plurality of wireless channels within the wireless communication network. The access point then provides a selection packet to the affiliated stations via the current wireless channel to indicate that the access point will begin using the desired wireless channel at a particular future time.

37 Claims, 4 Drawing Sheets

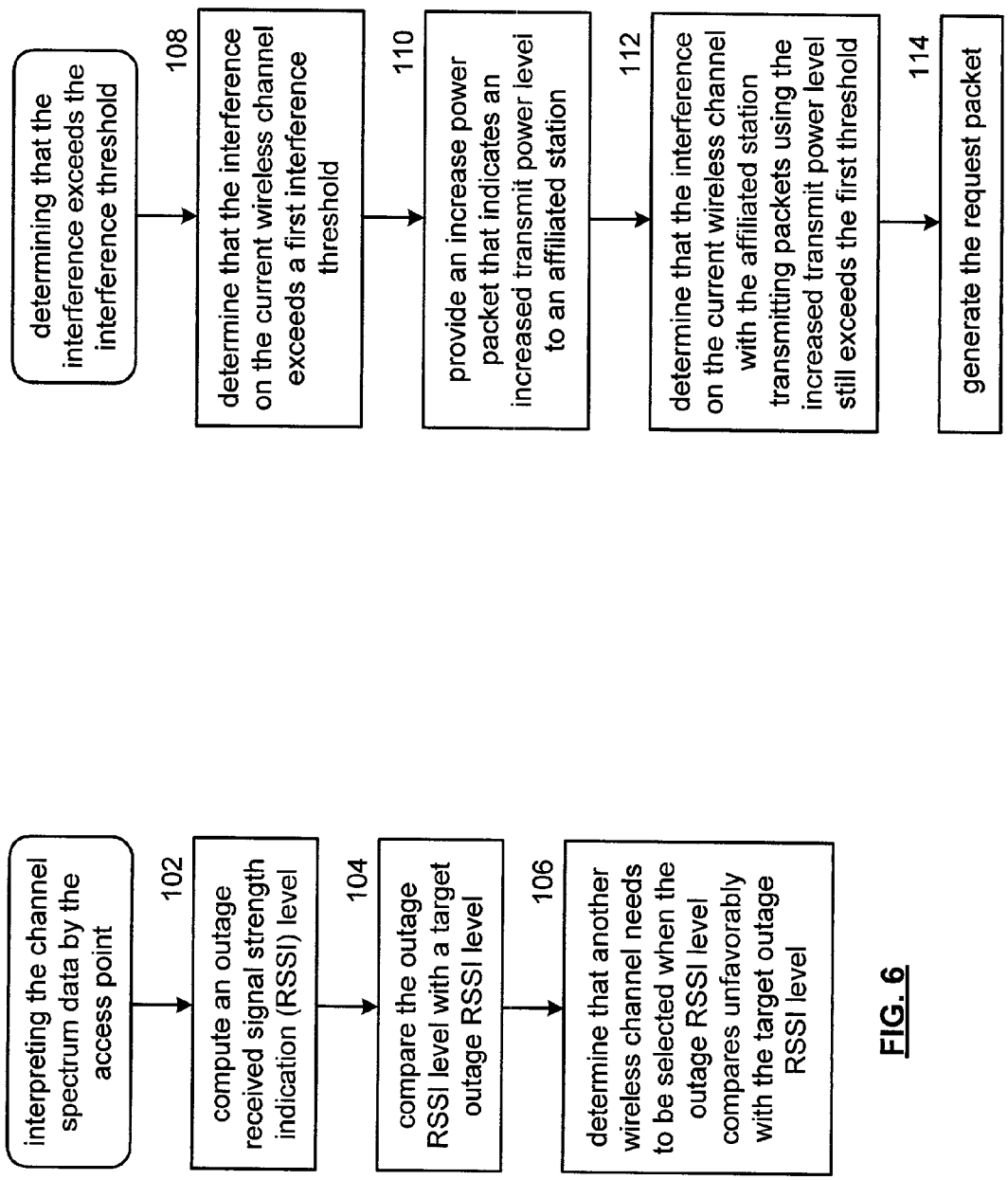

DYNAMIC FREQUENCY SELECTION IN A WIRELESS COMMUNICATION NETWORK

This patent is a continuation of pending provisional patent application entitled Joint Transmit Power Control and Dynamic Frequency Selection For Wireless Local Area Networks, having a provisional application number of No. 60/283,848, and a filing date of Apr. 13, 2001.

TECHNICAL FIELD OF THE INVENTION

This invention relates generally to wireless communication systems and more particularly to frequency, and/or channel, allocation in such wireless communication systems.

BACKGROUND OF THE INVENTION

Wireless communication systems are known to support wireless communications between wireless communication devices affiliated with the system. Such wireless communication systems range from national and/or international cellular telephone systems to point-to-point in-home wireless networks. Each type of wireless communication system is constructed, and hence operates, in accordance with one or more standards. Such wireless communication standards include, but are not limited to IEEE 802.11, Bluetooth, advanced mobile phone services (AMPS), digital AMPS, global system for mobile communications (GSM), code division multiple access (CDMA), wireless application protocols (WAP), local multi-point distribution services (LMDS), multi-channel multi-point distribution systems (MMDS), and/or variations thereof.

An IEEE 802.11 compliant wireless communication system includes a plurality of wireless communication devices (e.g., laptop, personal computer, personal digital assistant, et cetera) coupled to a station and a plurality of access points. The access points are physically distributed within the wireless communication system to provide seamless wireless services throughout the system for its wireless communication devices. As is known, each access point utilizes one of a plurality of channels (i.e., frequencies) to communicate with affiliated stations, (i.e., stations within the coverage area of the access point and registered with the access point). Such coverage area is generally referred to as a basic service set (BSS). To minimize interference between adjacent BSSs, access points use different channels. The use of differing channels forms a pattern of channel reuse, which is commonly referred to as a cell pattern.

Currently, the establishment of a cell pattern within a wireless communication system is a manual process. As such, when a BSS is added to or deleted from a wireless communication system, the cell pattern is manually revised (i.e., channel assignments are determined by a human system administrator, who reprograms the access points based on their new channel assignments). As with many computational intensive processes, having key decisions made by humans lead to potential errors, requires highly trained personnel, and is expensive.

As is also known, once a cell pattern is established there are few mechanisms to verify that the channel pattern is optimal (i.e. a BSS has acceptable levels of interference from adjacent BSSs). Typically, unacceptable interference is detected when customers (e.g., users of wireless communication devices) complain of poor service quality.

Therefore, a need exists for a method and apparatus that automates an access point's channel selection for optimal cell patterns, automates channel reallocation when interference on a current channel is unacceptable and/or to conform to regulatory requirements.

BRIEF DESCRIPTION OF THE DRAWINGS

FIGS. 5 through 7 illustrate logic diagrams that further define steps within the method of FIG. 4.

DETAILED DESCRIPTION OF A PREFERRED EMBODIMENT

Generally, the present invention provides a method and apparatus for dynamic frequency selection in a wireless communication system or network. Such a method and apparatus includes processing that begins when an access point determines interference on a wireless channel that is being used by the access point (i.e., current wireless channel). When the interference exceeds an interference threshold, or at random times determined by the access point, the access point provides a request packet to at least some of the affiliated stations being serviced by the access point for channel spectrum information. The processing continues as the affiliated stations, which receive the request, generate the channel spectrum information regarding each of the wireless channels in the wireless communication network. The processing proceeds then as the affiliated stations provide the channel spectrum information to the access point via the current wireless channel. The access point interprets the channel spectrum information to determine a desired wireless channel of the plurality of wireless channels within the wireless communication network. The interpretation may lead the access point to determine that the current wireless channel is the best channel to use at this time or another channel would provide a higher quality (i.e., less interference). The access point then provides a selection packet to the affiliated stations via the current wireless channel to indicate that the access point will begin using the desired wireless channel at a particular future time. With such a method and apparatus, an access point may dynamically select the particular channel it will use based on interference from adjacent channels acquired from its affiliated stations, thus optimizing cell pattern channel allocations and enabling an access point to reallocate its channel to improve quality of service.

Figure 1:
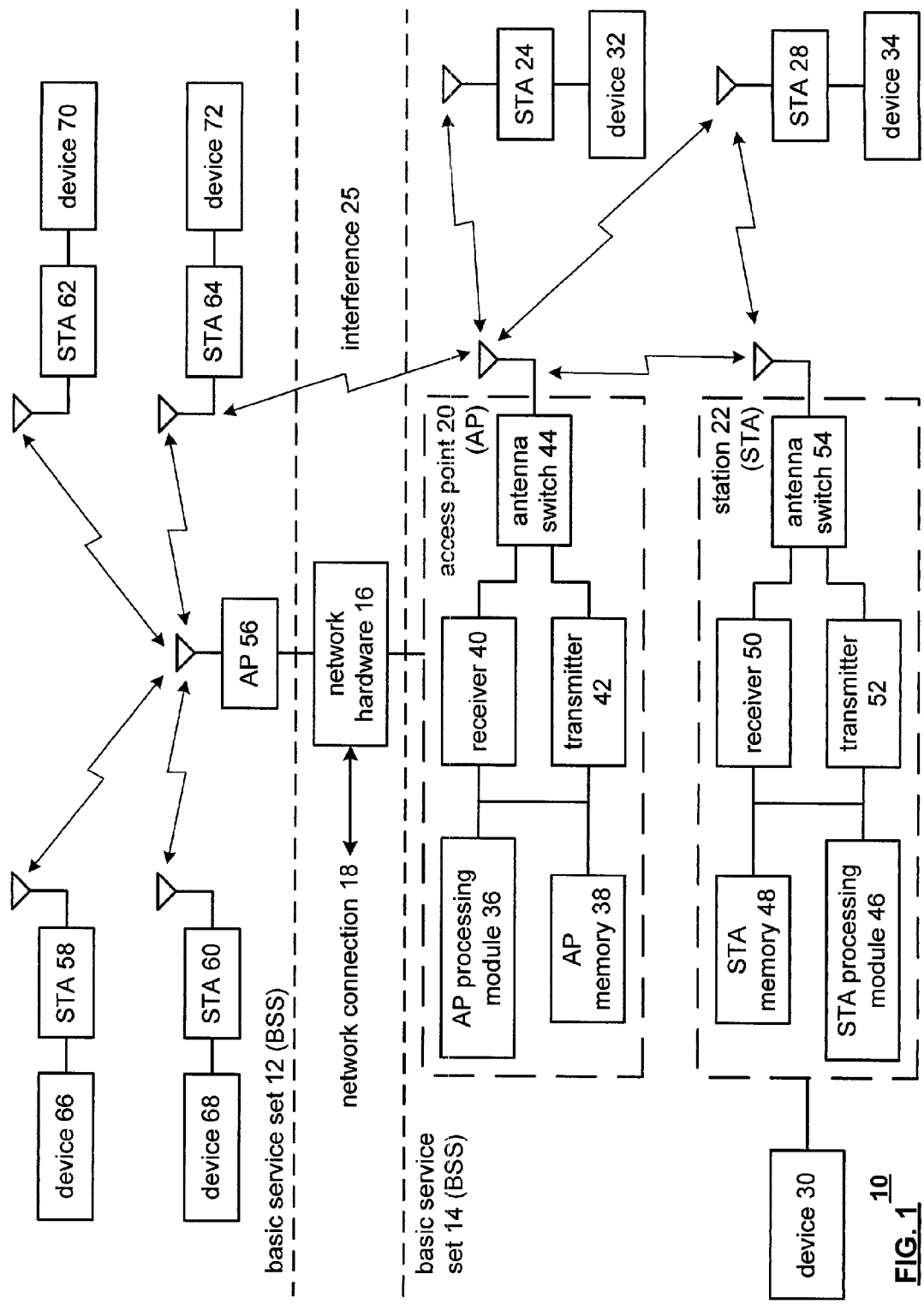
FIG. 1 illustrates a schematic block diagram of a wireless communication system in accordance with the present invention.

The present invention can be more fully described with reference to FIGS. 1 through 7. FIG. 1 illustrates a schematic block diagram of a wireless communication network, or system, 10 that includes a plurality of basic service sets 12 and 14 and a network hardware component 16. Each of the basic service sets (BSS) 12 and 14 include an access point 20 and 56 and a plurality of wireless communication devices. Each wireless communication device includes a device operably coupled to a station. For example, basic service set 14 includes device 30 operably coupled to station 22, device 32 operably coupled to station 24 and device 34 operably coupled to station 28. Similarly, basic service set 12 includes device 66 operably coupled to station 58, device 68 operably coupled to station 60, device 70 operably coupled to station 62 and device 72 operably coupled to station 64. As one of average skill in the art will appreciate, devices 30–34 and 66–72 may be a laptop computer, personal computer, server, home entertainment equipment, personal digital assistant, and/or any other device that may transceive wireless data via a station.

The network hardware 16 couples the wireless communication network to a network connection 18. Accordingly, the network hardware 16 may be a server, gateway, router, bridge, modem, and/or any device that provides a connection to the Internet, Local Area Network, and/or Wide Area Network. The network connection 18 may be a cable connection, twisted pair connection, fiber optic connection, et cetera.

In operation, any of the devices 30–34 and 66–72, via its associated station 22–28, 58–64, may communicate with any other device in the wireless communication network either directly or via an associated access point or points. In addition, each device, via its station, may communicate via the network connection 18 to provide interconnection to the World Wide Web, email, et cetera.

To facilitate communications and to support the dynamic frequency selection described herein, each access point 20 and 56 includes an antenna switch 44, receiver 40, transmitter 42, access point processing module 36 and access point memory 38. The access point processing module 36 may be a single processing device or a plurality of processing devices. Such a processing device may be a microprocessor, microcontroller, microcomputer, digital signal processor, field programmable gate array, programmable logic device, state machine, logic circuitry, analog circuitry, digital circuitry, and/or any device that manipulates signals (analog and/or digital) based on operational instructions. The access point memory 38 may be a single memory device or a plurality of memory devices. Such a memory device may be read-only memory, random access memory, volatile memory, non-volatile memory, static memory, dynamic memory, flash memory, and/or any device that stores digital information. Note that when the processing module 36 implements one or more of its functions via a state machine, logic circuitry, analog circuitry and/or digital circuitry, the memory storing the corresponding operational instructions is embedded within the circuitry comprising the state machine, logic circuitry, analog circuitry and/or digital circuitry. The operational instructions stored in memory 38 and executed by processing module 36 are graphically described with reference to this figure, FIGS. 2 through 3 and in logic diagrams 4 through 7.

The basic service set 14, or 12, supports, via the associated access point 20 or 56, a single wireless channel of a plurality of channels used within the wireless communication network 10. To obtain access to the wireless communication channel, the stations of the basic service set utilize a carrier sense multiple access with collision detection or avoidance scheme. Accordingly, there will be times when the channel is not in use. When the channel is idle, the access point 20 may determine interference on the channel from adjacent basic service sets, for example, basic service set 12. The access point 20 measures the interference 25 and determines whether it exceeds an interference threshold. For example, the access point 20 will determine the receive signal strength of the interference channel 25.

If the receive signal strength is unfavorable with respect to a desired threshold, which may be based on a signal to interference ratio, signal to noise ratio (e.g., less than 10 dB difference), frame failures (i.e., too many transmitted frames are not acknowledged), etc., the access point determines that the interference 25 has exceeded the threshold. When this is the case, the access point 20 generates a packet that requests each affiliate station to determine the signal energy on at least some of the plurality of channels supported by the system. The access point 20 transmits the request via the channel it is currently using to communication with its affiliated stations.

As an alternative to, or in addition to, determining undesirable interference on the current channel, the access point 20 may randomly provide a request for channel spectrum information to at least some of the affiliated stations. In this instance, the access point can accumulate channel spectrum data during idle times of the system, at periodic intervals, and/or any other metrics regarding system operation.

As a further alterative, and/or addition to, providing the request, the access point may specify the level of channel spectrum information is to be collected by the stations. For example, at one level, the request may request the receiving stations to provide power level indications of a set of specified channels, which may be some or all of the plurality of channels supported by the system. At another level, the request may request the stations to identify use of channels and provide the identification code of the access point using the particular channel. Such specific channel use information may be requested alternatively, or in addition to, providing the interference level information. Further, the access point may request differing levels of information from different stations.

In response to the request, a station determines the received signal strength indication (RSSI) for at least some of the channel in the wireless communication system. Since each station may be located anywhere within the coverage area of the basic service set, the received signal strength indications for a given channel will differ from the station to station. Note that the request provided by the access point may indicate which channels to determine RSSI, the station may determine which channels to determine RSSI, or a combination thereof.

The access point accumulates the channel spectrum information from the stations and determines whether an alternate channel will provide a higher quality of service (i.e., has a lower RSSI for interfering channels, has a better signal to interference ratio, a better signal to noise ratio, less frame failures, etc.). If this is the case, the access point 20 generates a packet indicating to the stations within its basic service set that it will switch to a different channel and when the switch will occur.

Each station, as depicted by station 22, includes an antenna switch 54, receiver 50, transmitter 52, station (STA) memory 48 and station (STA) processing module 46. The STA processing module 46 may be a single processing device or a plurality of processing devices. Such a processing device may be a microprocessor, microcontroller, microcomputer, digital signal processor, field programmable gate array, programmable logic device, state machine, logic circuitry, analog circuitry, digital circuitry, and/or any device that manipulates signals (analog and/or digital) based on operational instructions. The STA memory 48 may be a single memory device or a plurality of memory devices. Such a memory device may be read-only memory, random access memory, volatile memory, non-volatile memory, static memory, dynamic memory, flash memory, and/or any device that stores digital information. Note that when the processing module 36 implements one or more of its functions via a state machine, logic circuitry, analog circuitry and/or digital circuitry, the memory storing the corresponding operational instructions is embedded within the circuitry comprising the state machine, logic circuitry, analog circuitry and/or digital circuitry. The memory 48 stores and STA processing module 46 executes at least some operational instructions that are graphically described with reference to this figure, FIGS. 2 and 3 and in logic diagrams 4 through 7.

The receiver 50 includes an RSSI determination module to measure the received signal strength of each of the channels in the wireless communication system when requested by the access point, or other type of error detection circuitry including Signal to Noise ratio, Signal to Interference ratio, packet failures, etc. The processing module 46 accumulates this information and provides it as channel spectrum information back to the access point.

Figure 2:
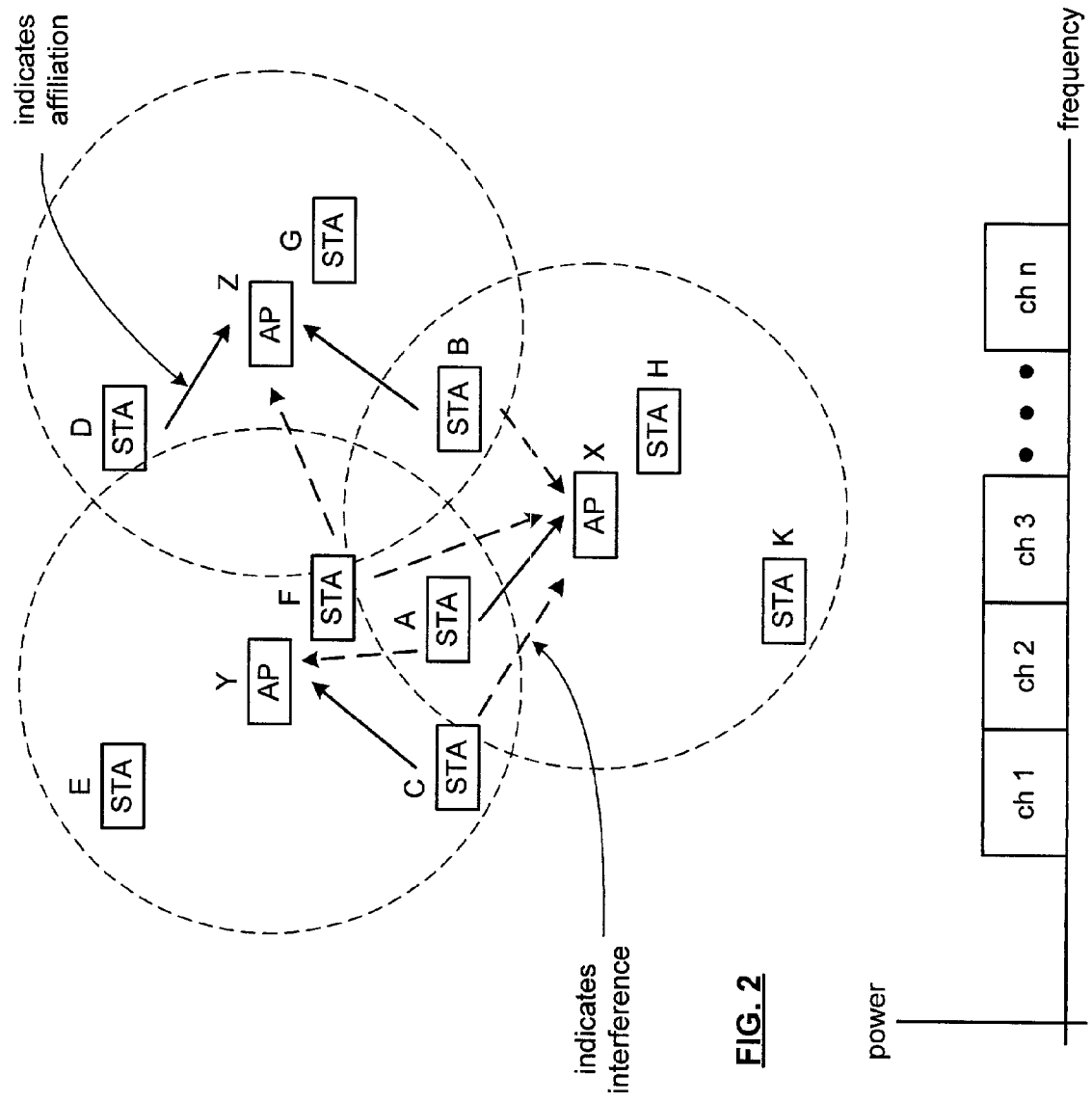
FIG. 2 illustrates a graphical representation of a cell pattern in accordance with the present invention.

FIG. 2 illustrates a graphical representation of a cell pattern for three basic service sets. In this illustration, one access point (AP), for example AP-X, utilizes a $1^{st}$ channel of the channels available within the wireless communication section system, a $2^{nd}$ access point, for example AP-Y, uses a $2^{nd}$ channel and a $3^{rd}$ access point, for example AP-Z, uses a $3^{rd}$ channel. The illustration includes multiple stations (A through K) that are affiliated with one of the access points. The affiliation, which is represented by a solid line, indicates that the station is registered with the corresponding access point. The dashed line indicates interference that an AP may receive from a station that is registered with an adjacent AP. For example, station A is affiliated with access point X and may provide interference, when transmitting, to access point Y. Similarly, station B is affiliated with access point Z and may provide interference, when transmitting, to access point X.

Figure 3:
FIG. 3 illustrates a frequency spectrum of channels that may be used by the wireless communication system in accordance with the present invention.

If access points X, Y, and Z are using adjacent channels, for example, channels 1, 2 and 3, respectively, as depicted in FIG. 3, a certain level of adjacent channel interference will be produced by the stations within overlapping coverage areas to the non-affiliated access point. For instance, if access point X utilizes channel 1, access point Y utilizes channel 2, and access point Z utilizes channel 3 when station A is transmitting, access point Y will receive, to some degree, adjacent channel interference of channel 1 due to station's A transmission. If this interference is substantial, i.e., has a received signal strength indication that degrades the performance of transmitting and receiving data on channel 2, access point Y will begin the dynamic frequency selection process. Alternatively, access point Y may periodically initiate the dynamic frequency selection process without cause. After performing the dynamic channel selection process, if access point Y determines that, for example, channel 5 is available and has a lower of interference, access point Y will switch its channel of use from channel 2 to channel 5.

Each access point in the wireless communication network may perform the dynamic frequency or channel selection process either based on a determination that its current channel has too much interference or whenever it so chooses. As such, when a basic service set is added or deleted from the network, the access points may adjust and/or reallocate its channel assignment to reduce adjacent channel interferences. In addition, whenever an access point determines that its current channel is not optimal (i.e., more interference than desired), the access point may initiate the dynamic frequency selection process.

In general, the dynamic frequency selection process, when initiated by an access point, requests at least some of the stations affiliated therewith to determine the receive signal strength of at least some of the channels within the wireless communication network. For example, if access point Y initiates the dynamic frequency selection process, it sends a packet to stations A, C, F and/or E on the currently allocated channel requesting that each station receiving the request determines the receive signal strength of the identified channels within the wireless communication network and/or to determine which access points are using which channels. If the plurality of channels used by the wireless communication system is as shown in FIG. 3, each station receiving the request will determine a receive signal strength for channel 1 through channel n, or a subset thereof as identified within the request, as determined by the station, or as determined by a default setting. Accordingly, based on its position within the coverage area of access point Y and the coverage areas of adjacent access points, the receive signal strength for each channel will vary from station to station. For example, if access point X is using channel 1, the receive signal strength indication obtained by station A will be larger than the receive signal strength indication obtained by station E. Based on the receive signal strength indication of the channels, and/or channel use information, provided by the stations, the access point, for example access point Y, may determine a new channel to utilize or may determine that the current channel is the best available.

FIGS. 4 through 7 illustrate a logic diagram of a method for dynamic frequency selection in a wireless communication network. The process begins at Step 80 or at Step 86. At step 80, an access point determines interference on a current wireless channel of a plurality of wireless channels. The current wireless channel is the channel that the access point is utilizing to communicate with affiliated stations within its coverage area. The determination of the interference may be done by transmitting a holding packet on the current wireless channel, wherein the holding packet addresses an invalid station. Accordingly, no station will reply. Thus, the access point may measure the interference on the current wireless channel during a transmit period allocated to the invalid station. A further discussion of the determination of the interference will be described in greater detail with reference to FIG. 7.

The process then proceeds to Step 82 where the access point determines whether the interference on the current wireless channel exceeds an interference threshold. Such interference may be caused by another BSS utilizing the same frequency or a strong interference source of any kind. Significant interference (i.e., exceeding the threshold) may also be indicated if the access point sees a low acknowledgment rate with respect to its packet transmitted to its affiliated stations. For example, the access point may determine that the interference on the current wireless channel is too large when the signal-to-noise ratio is 10 dB or less. Alternatively, the access point may determine that less than 95% of its transmitted packets are being acknowledged. If the interference does not exceed the threshold, the process proceeds to Step 84 where the access point continues to use the current channel.

If, however, the interference exceeds the threshold, or the access point is randomly accumulating channel spectrum data, the process proceeds to Step 86. At Step 86, the access point provides a request packet that request channel spectrum information to at least some affiliated stations via the current wireless communication channel. The request for channel spectrum information may be at various levels. For instance, at one level the channel spectrum information may include RSSI for each channel used by the system, RSSI for some of the channels used by the system, use information (e.g., identify the access point using a particular channel) for each of the channels used by the system, use information for some of the channels used by the system, or a combination thereof.

As previously mentioned, an affiliated station is one that is within the coverage area of the access point and is registered with the access point. The providing of the request packet to the affiliated stations may be done by polling the stations, enabling the stations to periodically generate the channel spectrum information and/or enabling the affiliated stations to spontaneously generate the channel spectrum information. For example, if the polling process is to be used, the access point sends a frame containing the request message to the stations. This frame may be in the form of a probe request frame with a dynamic frequency response request element.

The process then proceeds to Step 88 where the affiliated station generates the channel spectrum information of the plurality of wireless channels. This will be described in greater detail with reference to FIG. 5. The process then proceeds to Step 90 where the $3^{rd}$ station provides the channel spectrum information to the access point via the current wireless channel. The providing of the channel spectrum information may be done in a response element as illustrated in the following tables.

TABLE 1

Response Element-Top Level

| Octets: 1 | 1 | 1 | 1 | 8 | 8 | 1 | Variable |
|---|---|---|---|---|---|---|---|
| Element ID | Length | Channel | Time Interval | Total RSSI Histogram | Unknown RSSI Histogram | Number of BSSID Sets | BSS Sets |

The Channel and Time Interval octets are the same information that was received in the Response element of the Probe Request frame. The Total RSSI histogram describes the RSSI levels seen over the time interval. The format for the Total RSSI information is as shown in Table 2.

TABLE 2

Total RSSI Histogram Octets

| Octet: 1 | 1 | 1 | 1 | 1 | 1 | 1 | 1 |
|---|---|---|---|---|---|---|---|
| RSSI 0 Time | RSSI 1 Time | RSSI 2 Time | RSSI 3 Time | RSSI 4 Time | RSSI 5 Time | RSSI 6 Time | RSSI 7 Time |

Each octet contains the amount of observation time in time units (TU's) that the receiver measured the particular RSSI level. Any observation that is greater than zero, but less than 1 TU is rounded up to 1 TU.

The Unknown RSSI Histogram describes the signals that are received with valid PLCP headers, but for which the MAC header information connate be reliably determined. It has the form as shown in Table 3.

TABLE 3

Unknown RSSI Histogram Octets

| Octet: 1 | 1 | 1 | 1 | 1 | 1 | 1 | 1 |
|---|---|---|---|---|---|---|---|
| RSSI 0 Time | RSSI 1 Time | RSSI 2 Time | RSSI 3 Time | RSSI 4 Time | RSSI 5 Time | RSSI 6 Time | RSSI 7 Time |

Each octet contains the amount of observation time in TU's that the receiver measured the particular RSSI level on signals with valid PLCP headers, but for which the MAC header information could not be reliably determined. Any observation that is greater than zero, but less than 1 TU is rounded up to 1 TU.

After the Unknown Histogram is the Number of BSSID Sets octet followed by the BSS Sets. A maximum of four BSS Sets may be included in each Response Element. Each BSS Set has a variable length that is determined by the number of stations that were observed on the channel. The format of the BSS Sets is shown in Table 4.

TABLE 4

BSS Sets

| Octet: 6 | 2 | 2 | 3–10 | 6 |
|---|---|---|---|---|
| BSSID | Beacon Interval | Capability Information | Supported Rates | CF Parameter Set |

| Octet: 4 | 1 | Variable |
|---|---|---|
| IBSS Parameter Set | No. of Station Sets | Station Sets |

The Beacon Interval, Capability Information, Support Rates, CF Parameter Set, and IBSS Parameter Set are taken from the elements of a beacon frame from the AP in the BSS. The Number of Station Sets octet is the number of Station Sets that are reported in the response. The format of each Station Set is given in the Table 5.

TABLE 5

Station Sets

| Octets: 6 | 16 |
|---|---|
| Station Address | RSSI Histogram |

Each Station Set has the Station Address and an RSSI Histogram that describes the signal level distribution of the frame from the station. The histogram element is as shown in Table 6.

TABLE 6

RSSI Histogram Octets

| Octet: 1 | 1 | 1 | 1 | 1 | 1 | 1 | 1 |
|---|---|---|---|---|---|---|---|
| RSSI 0 Time | RSSI 1 Time | RSSI 2 Time | RSSI 3 Time | RSSI 4 Time | RSSI 5 Time | RSSI 6 Time | RSSI 7 Time |

Each octet contains the total amount of time (in TU's) that frames were received from the particular station at the particular RSSI level.

Returning to the main flow, the process then proceeds to Step 92 where the access point interprets the channel spectrum information to determine a desired wireless channel of the plurality of channels. This will be described in greater detail with reference to FIG. 6. Note that the access point may also choose the desired wireless channel based on a priority. For example, for an 802.11a application, the channels may be grouped into three groups: the $1^{st}$ group including channels within the frequency range of 5.15 gigahertz to 5.25 gigahertz, the $2^{nd}$ group containing the four channels in the frequency range of 5.25 gigahertz to 5.35 gigahertz and the $3^{rd}$ group containing four channels in the 5.725 to 5.825 gigahertz range. Such a prioritization scheme would first have the access point choose another channel within the same group if such a channel is available. If not, the access point would choose a channel in the closer group when switching to that group. Finally, if neither of those options is available, the access point chooses the farthest channel from the current channel to avoid any possible residual interference.

The process then proceeds to Step 94 where the access point provides a selection packet to the affiliated station via the current wireless channel to change to the desired wireless channel at a future time. Note that the access point, in combination with other access points are generating a basic service set pattern with its neighboring access points based on the channel spectrum information received by each access point. Thus, the access points are optimizing the cell pattern for the wireless communication network.

Figure 5:
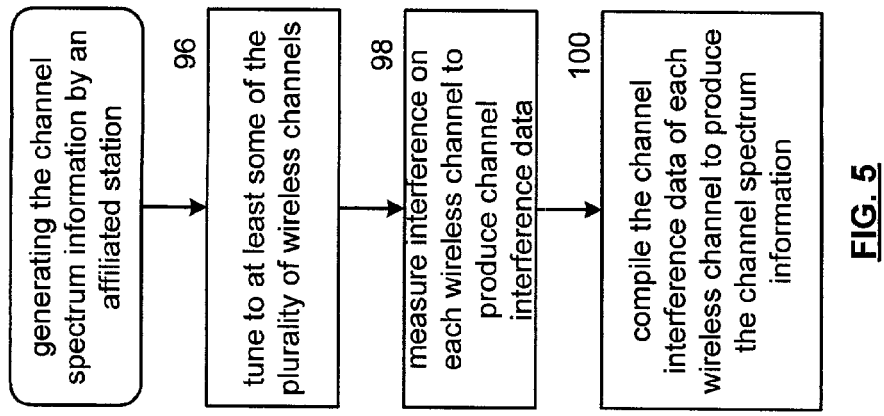
Figure 4:
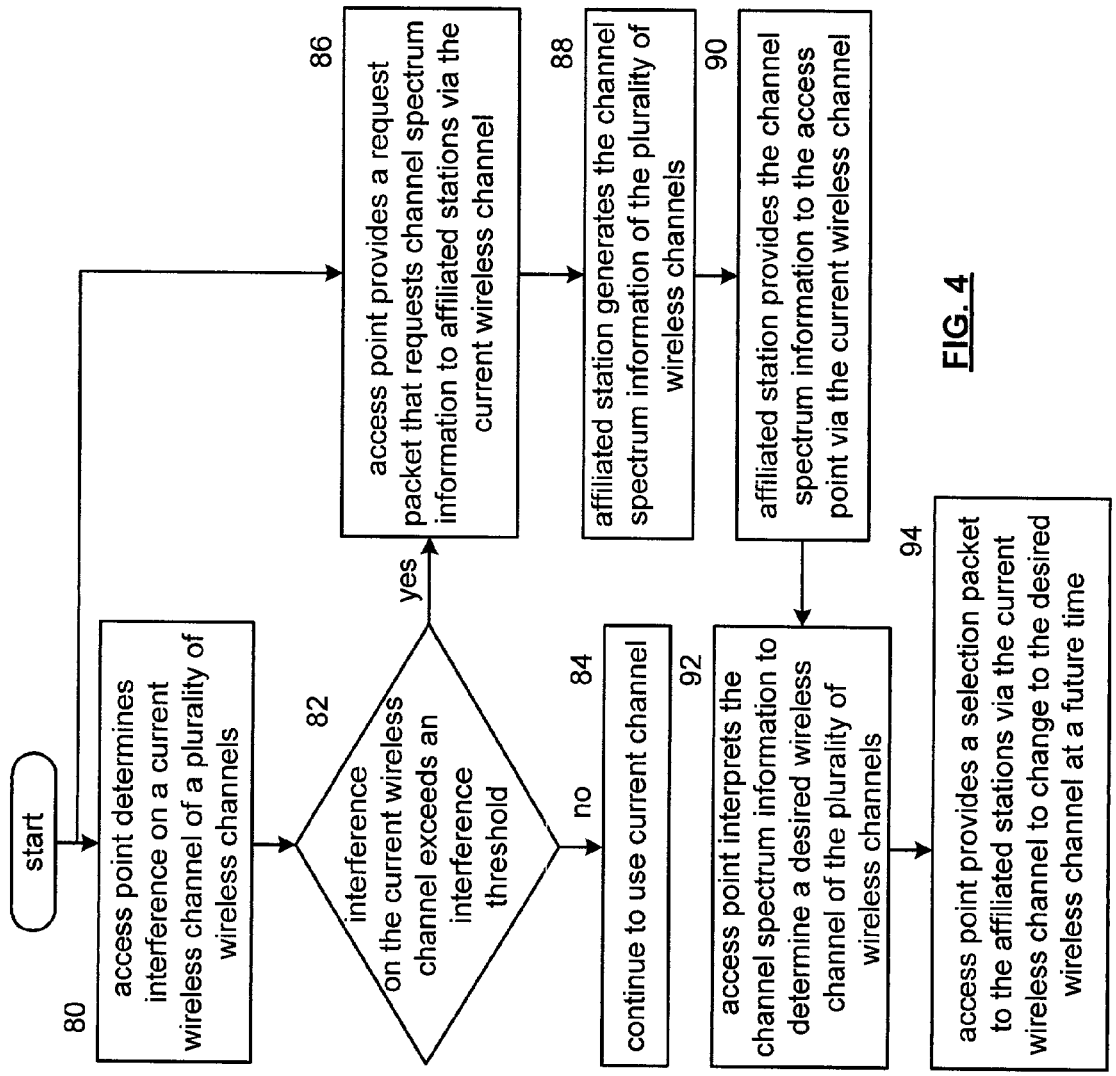
FIG. 4 illustrates a logic diagram of a method for dynamic frequency selection in a wireless communication system in accordance with the present invention.

FIG. 5 illustrates a logic diagram that further describes the generating of the channel spectrum information by an affiliated station. The process begins at Step 96 where the affiliated station tunes to the frequency of at least some of the wireless channel channels in the system as identified in the request or as otherwise identified. The process then proceeds to Step 98 where the affiliated station measures the interference on each wireless channel to produce channel interference data. The process then proceeds to Step 100 where the affiliated station compiles the channel interference data for each wireless channel to produce the channel spectrum information. Note that the interference may be determined by determining the outage RSSI level for each channel.

FIG. 6 illustrates a logic diagram that further describes the interpreting the channel spectrum data by the access point. The process begins at Step 102 where the access point computes an outage receive signal strength indication level. The process then proceeds to Step 104 where the access point compares the outage receive signal strength indication level with a targeted receive signal strength indication level. The process then proceeds to Step 107 where the access point determines that another wireless channel needs to be selected when the outage RSSI level compares unfavorably with the targeted outage RSSI level. Accordingly, the access point may select another channel when it has a more desirable RSSI level with respect to the target outage RSSI level. Alternatively, the access point may determine that it is best to stay with the current wireless channel based on the RSSI information.

FIG. 7 illustrates a logic diagram that further describes the determining that the interference exceeds the interference threshold. The process begins at Step 108 where the access point determines that the interference on the current wireless channel exceeds a $1^{st}$ interference threshold. Accordingly, the access point determines that the receive signal strength indication and/or signal-to-noise ratio of incoming signals on the current wireless channel are above a selected threshold (e.g., 10 dB). The process then proceeds to Step 110 where the access point provides an increase power packet to the affiliated stations, which request that the affiliated stations increase their transmit power levels. The process then proceeds to Step 112 where the access point determines the interference on the current channel with the affiliated stations transmitting at the higher power level. If the interference is still above the $1^{st}$ threshold, the process proceeds to Step 114 where the access point generates the request packet.

The preceding discussion has presented a method and apparatus for dynamically selecting frequencies and/or channels in a wireless communication network. By compiling interference levels received by each station affiliated within an access point, the access point can readily determine which channel will best serve its stations. Accordingly, the access point may change its channel of use to improve the quality of service and minimize the interference from adjacent basic service sets. As one of average skill in the art will appreciate, other embodiments may be derived from the teachings of the present invention, without deviating from the scope of the claims.

What is claimed is:

1. A method for dynamic frequency selection in a wireless communication network, the method comprising:

determining, by an access point, interference on a current wireless channel of a plurality of wireless channels by:
transmitting a holding packet on the current wireless channel, wherein the holding packet addresses an invalid wireless station; and
measuring the interference on the current wireless channel during a transmit period allocated to the invalid wireless station;

when the interference on the current wireless channel exceeds an interference threshold, providing, by the access point, a request packet that requests channel spectrum information to at least one affiliated wireless station via the current wireless channel;

generating, by the at least one affiliated wireless station, the channel spectrum information of the plurality of wireless channels;

providing, by the at least one affiliated wireless station, the channel spectrum information to the access point via the current wireless channel;

interpreting, by the access point, the channel spectrum information to determine a desired wireless channel of the plurality of wireless channels; and providing, by the access point, a selection packet to the at least one affiliated wireless station via the current wireless channel, wherein the selection packet indicates that the access point will change to the desired wireless channel at a future time.

2. The method of claim 1, wherein the providing the request packet by the access point further comprises at least one of:
polling the at least one affiliated wireless station;
enabling a periodic generation of the channel spectrum information; and
enabling a spontaneous generation of the channel spectrum infomratioin.

3. The method of claim 1, wherein the generating the channel spectrum information by the at least one affiliated wireless station further comprises:
for at least some of the plurality of wireless channels;
tuning to the each of the at least some of the plurality of wireless channels;
measuring interference on the each of the at least some of the plurality of wireless channels to produce channel interference data; and
compiling the channel interference data of each of the at least some of the plurality of wireless channels to produce the channel spectrum information.

4. The method of claim 1, wherein the interpreting the channel spectrum data by the access point further comprises:
computing an outage received signal strength indication level;
comparing the outage received signal strength indication level with a target outage received signal strength indication level; and
determining that another wireless channel of the plurality of wireless channels needs to be selected when the outage received signal strength indication level compares unfavorably with the target outage received signal strength indication level.

5. The method of claim 4 further comprises determining the desired wireless channel by:
selecting another channel within a group of channels of the plurality of channels based on a channel prioritization.

6. The method of claim 1, wherein the interpreting the channel spectrum information by the access point further comprises:
selecting the current wireless channel as the desired wireless channel when the current wireless channel has a least amount of interference in comparison to other wireless channels of the plurality off wireless channels.

7. The method of claim 1 further comprises:
generating, by the access point, a basic service set pattern of neighboring access points within the wireless communication network based on the channel spectrum information.

8. The method of claim 1, wherein the determining that the interference exceeds the interference threshold by the access point further comprises:
determining that the interference on the current wireless channel exceeds a first interference threshold;
providing an increase power packet that indicates an increased transmit power level to the at least one affiliated wireless station;
determining that the interference on the current wireless channel with the at least one affiliated wireless station transmitting packets using the increased transmit power level still exceeds the first threshold, and
when the interference on the current wireless channel with the at least one affiliated wireless station transmitting packets using the increased transmit power level still exceeds the first threshold, generating by the access point, the request packet.

9. A method for an access point to dynamically select a frequency within a wireless communication network, the method comprising:
determining interference on a current wireless channel of a plurality of wireless channels by transmitting a holding packet on the current wireless channel, wherein the holding packet addresses an invalid wireless station, and measuring the interference on the current wireless channel during a transmit period allocated to the invalid wireless station;
obtaining channel spectrum information from at least one affiliated wireless station via the current wireless channel of a plurality of wireless channels, wherein the channel spectrum information indicates level interference on at least some of the plurality of wireless channels within the channel spectrum;
interpreting the channel spectrum information to determine a desired wireless channel of the plurality of wireless channels; and
providing a packet to the at least one affiliated wireless station via the current wireless channel, wherein the packet indicates that the access point will change to the desired wireless channel at a future time.

10. The method of claim 9, wherein the interpreting the channel spectrum data further comprises:
computing an outage received signal strength indication level;
comparing the outage received signal strength indication level with a target outage received signal strength indication level; and
determining that another wireless channel of the plurality of wireless channels needs to be selected when the outage received signal strength indication level compares unfavorably with the target outage received signal strength indication level.

11. The method of claim 10 further comprises determining the desired wireless channel by:
selecting another channel within a group of channels of the plurality of channels based on a channel prioritization.

12. The method of claim 9, wherein the interpreting the channel spectrum information further comprises:
selecting the current wireless channel as the desired wireless channel when the current wireless channel has a least amount of interference in comparison to other wireless channels of the plurality of wireless channels.

13. The method of claim 10 further comprises;
generating a basic service set pattern of neighboring access points within the wireless communication network based on the channel spectrum information.

14. The method of claim 9, wherein the interpreting the channel spectrum information further comprises:
determining that interference on the current wireless channel exceeds a first interference threshold;
providing an increase power packet that indicates an increased transmit power level to at least one affiliated wireless station;
determining that the interference on the current wireless channel with the at least one affiliated wireless station transmitting packets using the increased transmit power level still, exceeds the first threshold, and
when the interference on the current wireless channel with the at least one affiliated wireless station transmitting packets using the increased transmit power level still exceeds the first threshold, generating, by the access point, the request packet.

15. A wireless communication network that includes a plurality of basic service sets, wherein each of the plurality of basic service sets comprises:
an access point (AP); and
a plurality of wireless stations, wherein the access point includes an AP processing module and an AP memory, wherein the AP memory further includes operational instructions that cause the AP processing module to:
determine interference on a current wireless channel of a plurality of wireless channels by:
transmitting a holding packet on the current wireless channel, wherein the holding packet addresses an invalid wireless station; and
measuring the interference on the current wireless during a transmit period allocated to the invalid wireless station;
when the interference on the current wireless channel exceeds an interference threshold, provide a request packet that requests channel spectrum information to at least one affiliated wireless station of the plurality of wireless stations via the current wireless channel;
interpret the channel spectrum information to determine a desired wireless channel of the plurality of wireless channels;
provide a selection packet to the at least one affiliated wireless station via the current wireless channel, wherein the selection packet indicates that the access point will change to the desired wireless channel at a future time, and
wherein each of the plurality of wireless stations (STA) includes a STA processing module and STA memory, wherein the STA memory includes operational instructions that cause the STA processing module to:
generate, as the at least one affiliated wireless station, the channel spectrum information of at least some of the plurality of wireless channels;
provide, as the at least one affiliated wireless station, the channel spectrum information to the access point via the current wireless channel.

16. The wireless communication network of claim 15, wherein the AP memory further comprises operational instructions that cause the AP processing module to provide the request packet by at least one of:
polling the at least one affiliated wireless station;
enabling a periodic generation of the channel spectrum information; and
enabling a spontaneous generation of the channel spectrum information.

17. The wireless communication network of claim 15, wherein the STA memory of the at least one affiliated wireless station further comprises operational instructions that cause the STA processing module of the at least one affiliated wireless station to generate the channel spectrum information by:
for the at least some of the plurality of wireless channels;
tuning to each of the at least some of the plurality of wireless channels;
measuring interference on the each of the at least some of the plurality of wireless channels to produce channel interference data; and
compiling the channel interference data of the each of the at least some of the plurality of wireless channels to produce the channel spectrum information.

18. The wireless communication network of claim 15, wherein the AP memory further comprises operational instructions that cause the AP processing module to interpret the channel spectrum data by:
computing an outage received signal strength indication level;
comparing the outage received signal strength indication level with a target outage received signal strength indication level; and
determining that another wireless channel of the plurality of wireless channels needs to be selected when the outage received signal strength indication level compares unfavorably with the target outage received signal strength indication level.

19. The wireless communication network of claim 18, wherein the AP memory further comprises operational instructions that cause the AP processing module to determine the desired wireless channel by:
selecting another channel within a group of channels of the plurality of channels based on a channel prioritization.

20. The wireless communication network of claim 15, wherein the AP memory further comprises operational instructions that cause the AP processing module to interpret the channel spectrum information by:
selecting the current wireless channel as the desired wireless channel when the current wireless channel has a least amount of interference in comparison to other wireless channels of the plurality of wireless channels.

21. The wireless communication network of claim 15, wherein the AP memory further comprises operational instructions that cause the AP processing module to:
generate a basic service set pattern of neighboring access points within the wireless communication network based on the channel spectrum information.

22. The wireless communication network of claim 15, wherein the AP memory further comprises operational instructions that cause the AP processing module to determine that the interference exceeds the interference threshold by:
determining that the interference on the current wireless channel exceeds a first interference threshold;
providing an increase power packet that indicates an increased transmit power level to the at least one affiliated wireless station;
determining that the interference on the current wireless channel with the at least one affiliated wireless station transmitting packets using the increased transmit power level still exceeds the first threshold, and
when the interference on the current wireless channel with the at least one affiliated wireless station transmitting packets using the increased transmit power level still exceeds the first threshold, generating, by the access point, the request packet.

23. An access point for use in a wireless communication network, the access point comprises:
an AP processing module; and
an AP memory, wherein the AP memory further includes operational instructions that cause the AP processing module to:
determine interference on a current wireless channel of a plurality of wireless channels by transmitting a holding packet on the current wireless channel, wherein the holding packet addresses an invalid wireless station, and measuring the interference on the current wireless channel during a transmit period allocated to the invalid wireless station;

when the interference on the current wireless channel exceeds an interference threshold, provide a request packet that requests channel spectrum information to at least one affiliated wireless station of a plurality of wireless stations via the current wireless channel;

interpret the channel spectrum information to determine a desired wireless channel of the plurality of wireless channels; and provide a selection packet to the at least one affiliated wireless station via the current wireless channel, wherein the selection packet indicates that the access point will change to the desired wireless channel at a particular future time and includes the particular future time.

24. The access point of claim 23, wherein the AP memory further comprises operational instructions that cause the AP processing module to provide the request packet by at least one of:

polling the at least one affiliated wireless station;

enabling a periodic generation of the channel spectrum information; and enabling a spontaneous generation of the channel spectrum information.

25. The access point of claim 23, wherein the AP memory further comprises operational instructions that cause the AP processing module to interpret the channel spectrum data by:

computing an outage received signal strength indication level;

comparing the outage received signal strength indication level with a target outage received signal strength indication level; and determining that another wireless channel of the plurality of wireless channels needs to be selected when the outage received signal strength indication level compares unfavorably with the target outage received signal strength indication level.

26. The access point of claim 25, wherein the AP memory further comprises operational instructions that cause the AP processing module to determine the desired wireless channel by:

selecting another channel within a group of channels of the plurality of channels based on a channel prioritization.

27. The access point of claim 23, wherein the AP memory further comprises operational instructions that cause the AP processing module to interpret the channel spectrum information by:

selecting the current wireless channel as the desired wireless channel when the current wireless channel has a least amount of interference in comparison to other wireless channels of the plurality of wireless channels.

28. The access point of claim 23, wherein the AP memory further comprises operational instructions that cause the AP processing module to:

generate a basic service set pattern of neighboring access points within the wireless communication network based on the channel spectrum information.

29. The access point of claim 23, wherein the AP memory further comprises operational instructions that cause the AP processing module to determine that the interference exceeds the interference threshold by:

determining that the interference on the current wireless channel exceeds a first interference threshold;

providing an increase power packet that indicates an increased transmit power level to the at least one affiliated station;

determining that the interference on the current wireless channel with the at least one affiliated station transmitting packets using the increased transmit power level still exceeds the first threshold, and when the interference on the current wireless channel with the at least one affiliated station transmitting packets using the increased transmit power level still exceeds the first threshold, generating, by the access point, the request packet.

30. A wireless station for use in a wireless communication network, the wireless station comprises:

STA processing module; and

STA memory, wherein the STA memory includes operational instructions that cause the STA processing module to:

receive a request packet from an access point via a current wireless channel that requests channel spectrum information, wherein the request packet is transmitted by the access point in response to the access point determining interference on the current wireless channel by transmitting a holding packet on the current wireless channel, wherein the holding packet addresses an invalid wireless station, and measuring the interference on the current wireless channel during a transmit period allocated to the invalid wireless station;

generate, as an affiliated wireless station of an access point of the wireless communication network, the channel spectrum information of at least some of the plurality of wireless channels;

provide, as the affiliated wireless station, the channel spectrum information to the access point via the current wireless channel; and receive, from the access point, a packet that indicates that the access point will change to the desired wireless channel at a particular future time and includes the particular future time.

31. The station of claim 30, wherein the STA memory further comprises operational instructions that cause the STA processing module to generate the channel spectrum information by:

for each of at least some of the plurality of wireless channels:

tuning to the each of the at least some of the plurality of wireless channels;

measuring interference on the each of the at least some of the plurality of wireless channels to produce channel interference data; and compiling the channel interference data of the at least noise of the plurality off wireless channels to produce the channel spectrum information.

32. An access point to dynamically select a frequency within a wireless communication network, the access point comprises:

AP processing module; and

AP memory that includes operational instructions that cause the AP processing module to:

determine interference on a current wireless channel of a plurality of wireless channels by transmitting a holding packet on the current wireless channel, wherein the holding packet addresses an invalid wireless station, and measuring the interference on the current wireless channel during a transmit period allocated to the invalid wireless station;

obtain channel spectrum information information from at least one affiliated wireless station via the current wireless channel of a plurality of wireless channels, wherein the channel spectrum information indicates level interference on at least some of the plurality of wireless channels within the channel spectrum;

interpret the channel spectrum information to determine a desired wireless channel of the plurality of wireless channels; and provide a packet to the at least one affiliated wireless station via the current wireless channel, wherein the packet indicates that the access point will change to the desired wireless channel at a future time.

33. The access point of claim 32, wherein the AP memory further comprises operational instructions that cause the AP processing module to interpret the channel spectrum data by:

computing an outage received signal strength indication level;

comparing the outage received signal strength indication level with a target outage received signal strength indication level; and determining that another wireless channel of the plurality of wireless channels needs to be selected when the outage received signal strength indication level compares unfavorably with the target outage received signal strength indication level.

34. The access point of claim 33, wherein the AP memory further comprises operational instructions that cause the AP processing module to determine the desired wireless channel by:

selecting another channel within a group of channels of the plurality of channels based on a channel prioritization.

35. The access point of claim 32, wherein the AP memory further comprises operational instructions that cause the AP processing module to interpret the channel spectrum information by:

selecting the current wireless channel as the desired wireless channel when the current wireless channel has a least amount of interference in comparison to other wireless channels of the plurality of wireless channels.

36. The access point of claim 32, wherein the AP memory further comprises operational instructions that cause the AP processing module to:

generate a basic service set pattern of neighboring access points within the wireless communication network based on the channel spectrum information.

37. The access point of claim 32, wherein the AP memory further comprises operational instructions that cause the AP processing module to interpret the channel spectrum information by:

determining that interference on the current wireless channel exceeds a first interference threshold;

providing an increase power packet that indicates an increased transmit power level to at least one affiliated wireless station;

determining that the interference on the current wireless channel with the at least one affiliated wireless station transmitting packets using the increased transmit power level still exceeds the first threshold, and when the interference on the current wireless channel with the at least one affiliated wireless station transmitting packets using the increased transmit power level still exceeds the first threshold, generating, by the access point, the request packet.

* * * * *

UNITED STATES PATENT AND TRADEMARK OFFICE
CERTIFICATE OF CORRECTION

| | | |
|---|---|---|
| PATENT NO. | : 7,158,759 B2 | Page 1 of 1 |
| APPLICATION NO. | : 10/011004 | |
| DATED | : January 2, 2007 | |
| INVENTOR(S) | : Christipher Hansen et al. | |

It is certified that error appears in the above-identified patent and that said Letters Patent is hereby corrected as shown below:

Column 11, line 11, in Claim 2: replace "infomratioin." with --information.--

Column 16, line 49, in Claim 31: replace "noise" with --some--

Signed and Sealed this

Twenty-fifth Day of November, 2008

JON W. DUDAS
*Director of the United States Patent and Trademark Office*